(12) United States Patent
Dimitrakos et al.

(10) Patent No.: US 8,713,636 B2
(45) Date of Patent: Apr. 29, 2014

(54) COMPUTER NETWORK RUNNING A DISTRIBUTED APPLICATION

(75) Inventors: Theo Dimitrakos, Colchester (GB); Ivan Djordjevic, London (GB); Srijith K Nair, Amsterdam (NL)

(73) Assignee: BRITISH TELECOMMUNICATIONS public limited company, London (GB)

( * ) Notice: Subject to any disclaimer, the term of this patent is extended or adjusted under 35 U.S.C. 154(b) by 807 days.

(21) Appl. No.: 12/594,059

(22) PCT Filed: Mar. 28, 2008

(86) PCT No.: PCT/GB2008/001077
§ 371 (c)(1),
(2), (4) Date: Sep. 30, 2009

(87) PCT Pub. No.: WO2008/119959
PCT Pub. Date: Oct. 9, 2008

(65) Prior Publication Data
US 2010/0049968 A1    Feb. 25, 2010

(30) Foreign Application Priority Data
Mar. 30, 2007 (EP) ...................................... 07251420

(51) Int. Cl.
*H04L 29/06* (2006.01)
*G06F 21/00* (2013.01)

(52) U.S. Cl.
USPC .............................................. 726/3; 709/201

(58) Field of Classification Search
None
See application file for complete search history.

(56) References Cited

U.S. PATENT DOCUMENTS 6,185,678 B1    2/2001 Arbaugh et al.
6,807,636 B2   10/2004 Hartman et al.
6,944,643 B1    9/2005 Ahmad et al.
(Continued)

FOREIGN PATENT DOCUMENTS

| WO | 00/45256 | 8/2000 |
| WO | 03/091895 | 11/2003 |
| WO | 2006/001193 A1 | 2/2006 |
| WO | 2006/011943 | 2/2006 |
| WO | 2007/099276 | 9/2007 |

OTHER PUBLICATIONS

Chivers, Howard and Martin, Andrew; Workshop on Grid Security Practice and Experience; Jul. 2004; Oxford; pp. II-15 to II-25.*

(Continued)

*Primary Examiner* — Gilberto Barron, Jr.
*Assistant Examiner* — Malcolm Cribbs
(74) *Attorney, Agent, or Firm* — Nixon & Vanderhye P.C.

(57) ABSTRACT

A computer network is disclosed in which a group of computers co-operate to perform a distributed application. In order to ensure that only members of that group of computers are able to carry out certain operations, messages sent in the performance of the distributed application are checked by the recipient for the presence of a group membership token. The inclusion of a group membership token is controlled by one or more group membership handlers which intercept messages from local components and only include a group membership token with the message if they list the sending local component as being entitled to include the group membership token in the message. Furthermore, by operating the group membership token on a separate machine, or preferably a separate virtual machine from the local component, security is further improved. In the most preferred embodiments, the group token handler and/or the local component are hosted on virtual machines which provide virtualised cryptographic functionality.

10 Claims, 9 Drawing Sheets

(56) References Cited

U.S. PATENT DOCUMENTS

| | | | |
|---|---|---|---|
| 6,957,330 B1 | 10/2005 | Hughes et al. | |
| 6,973,657 B1 | 12/2005 | Ahmad et al. | |
| 2002/0067818 A1 | 6/2002 | Barathan et al. | |
| 2002/0169987 A1* | 11/2002 | Meushaw et al. | 713/201 |
| 2003/0004746 A1 | 1/2003 | Kheirolomoom et al. | |
| 2003/0056093 A1 | 3/2003 | Huitema et al. | |
| 2003/0131245 A1 | 7/2003 | Linderman | |
| 2003/0196083 A1 | 10/2003 | Grawrock et al. | |
| 2004/0010682 A1* | 1/2004 | Foster et al. | 713/156 |
| 2004/0039803 A1 | 2/2004 | Law | |
| 2004/0131187 A1 | 7/2004 | Takao et al. | |
| 2004/0136386 A1 | 7/2004 | Miller et al. | |
| 2004/0167984 A1 | 8/2004 | Herrmann | |
| 2004/0193912 A1 | 9/2004 | Li et al. | |
| 2004/0249950 A1 | 12/2004 | Christensen et al. | |
| 2004/0267901 A1* | 12/2004 | Gomez | 709/217 |
| 2005/0027837 A1 | 2/2005 | Roese et al. | |
| 2005/0044197 A1 | 2/2005 | Lai | |
| 2005/0081038 A1 | 4/2005 | Arditti Modiano et al. | |
| 2005/0081055 A1 | 4/2005 | Patrick et al. | |
| 2005/0086197 A1 | 4/2005 | Boubez et al. | |
| 2005/0138416 A1 | 6/2005 | Qian et al. | |
| 2005/0152542 A1 | 7/2005 | Zheng et al. | |
| 2005/0160289 A1 | 7/2005 | Shay | |
| 2005/0169461 A1 | 8/2005 | Canard et al. | |
| 2005/0172133 A1 | 8/2005 | Brumme et al. | |
| 2005/0183021 A1* | 8/2005 | Allen et al. | 715/747 |
| 2005/0246552 A1 | 11/2005 | Bade et al. | |
| 2006/0013400 A1 | 1/2006 | Sutton et al. | |
| 2006/0015728 A1 | 1/2006 | Ballinger et al. | |
| 2006/0041669 A1 | 2/2006 | Bemmel et al. | |
| 2006/0048210 A1 | 3/2006 | Hildre et al. | |
| 2006/0069662 A1 | 3/2006 | Laborczfalvi et al. | |
| 2006/0256107 A1 | 11/2006 | Scarlata et al. | |
| 2007/0124797 A1 | 5/2007 | Gupta et al. | |
| 2007/0239987 A1 | 10/2007 | Hoole et al. | |
| 2008/0022385 A1 | 1/2008 | Crowell et al. | |
| 2008/0148377 A1* | 6/2008 | Kumar et al. | 726/9 |
| 2010/0138674 A1 | 6/2010 | Dimitrakos et al. | |

OTHER PUBLICATIONS

International Search Report for PCT/GB2008/001077, mailed Sep. 24, 2008.
Written Opinion of the Int'l Searching Authority for PCT/GB2007/001077, mailed Sep. 24, 2008.
Patrick McDaniel et al.; 1999; "Antigone: a flexible framework for secure group communication"; In Proceedings of the 9$^{th}$ Conference on USENIX Security Symposium—vol. 8 (SSYM'99); vol. 8; USENIX Association, Berkeley, CA, USA pp. 99-114.
Hongbin Liu, Geoffrey Fox, Marlon Pierce, Shrideep Pallickara; A Multi-party Implementation of WS—SecureConversation Technical Report, Apr. 2005., 13 pgs.
State of the Art Evaluation—phase 1, WP10 State of the Art Deliverable; Imperial College London, Jun. 10, 2004, Issue 1; 374 pgs. (with emphasis on pp. 283-290).
TCG Specification Architecture Overview, Specification Revision 1.2, Apr. 28, 2004., 54 pgs.
Sandro Rafaeli and David Hutchison; 2003; "A survey of key management for secure group communication"; ACM Comput. Surv. 35; 3 (Sep. 2003); pp. 309-329.
IBM Research Report; vTPM: Virtualizing the Trused Platform Module; Stefan Berger et al.; IBM Research Division, Yorktown Heights, NY; Feb. 14, 2006., 17 pgs.
Workshop on Grid Security Practice and Experience (UK e-Science Security Task Force), Oxford, Jul. 8-9, 2004; see especially "Dynamic Security Perimeters for Grid-enabled Collaboration" by T. Dimitrakos et al., and "Multilayer Privilege Management for Dynamic Collaborative Scientic Communities" by David Chadwick et al., 25 pgs.
Anderson, R. et al.; "Cryptographic Processors—A Survey"; Proceedings of the IEEE; vol. 94, No. 2; pp. 357-369; Feb. 2006.
N. Asokan and P. Ginzboorg; "Key agreement in ad hoc networks"; Computer Communications; vol. 23; Issue 17; Nov. 1, 2000; pp. 1627-1637.
T. Garfinkel et al.; "Terra: a virtual machine-based platform for trusted computing"; SIGOPS Oper. Syst. Rev. 37, 5 (Oct. 2003)., 14 pgs.
M. Rosenblum and T. Garfinkel; "Virtual machine monitors: current technology and future trends"; *Computer*; vol. 38, No. 5; pp. 39-47; May 2005.
Book Chapter; Authors; L. Chen and T. Pedersen; Editor: De Santis, Alfredo; Primary Title: New group signature schemes; Book Title: Advances in Cryptology—EUROCRYPT'94; Book Series Title: Lecture Notes in Computer Science; Copyright: 1995; Publisher: Springer Berlin/Heidelberg; Isbn: 978-3-540-60176-0; Subject: Computer Science; Start p. 171; End p. 181; vol. 950.
Luis Felipe Cabrera et al.; Web Services Coordination (WS-Coordination); Version 1.0; Aug. 2005; 23 pgs.
B. Lehane et al.; Shared RSA key generation in a mobile ad hoc network; In Proceedings of the 2003 IEEE conference on Military communications—vol. 11 (MILCOM'03); vol. 11; IEEE Computer Society, Washington, DC, 2003; pp. 814-819.
Orlova A., et al.; "Basic TrustCoM Reference Implementation"; Internet Citation; (Sep. 30, 2005)., 90 pgs.
Djordjevic et al., "Dynamic security perimeters for inter-enterprise service integration"; Future Generation Computer Systems; vol. 23; No. 4; (Feb. 2, 2007); pp. 633-657.
Wilson M. D. et al.; "TrustCoM Framework V2"; Internet Citation; (Jan. 31, 2006)., 182 pgs.
Manes et al., The Burton Group, "Root Document Turning the Network Into the Computer: The Emerging Network Application Platform," vol. 1.0, Jul. 8, 2004, 50 pages.
RSA Security Inc., "DataPower XML Web Services Access Control and Federated Identity Management," 2005, 2 pages.
Dimitrakos et al., "Enabling Dynamic Security Perimeters for Virtual Collaborations," eAdoption and the Knowledge Economy: Issues, Applications, Case Studies, IOS Press Amsterdam, 2004, pp. 1191-1198.
Dimitrakos et al., "Towards a Grid Platform Enabling Dynamic Virtual Organisations for Business Applications," in Proc. of 3$^{rd}$ Int. Conf. on Trust Management, iTrust 2005, LNCS 3477, 2005, pp. 406-410.
Dimitrakos et al., "TrustCoM—A Trust and Contract Management Framework Enabling Secure Collaborations in Dynamic Virtual Organisations," ERCIM News, No. 59, Oct. 2004, pp. 59-60.
Dimitrakos et al., "Towards a Trust and Contract Management Framework for Dynamic Virtual Organisations," eAdoption and the Knowledge Economy: Issues, Applications, Case Studies, IOS Press Amsterdam, ISBN: 1-58603-470-7, 2004, 9 pages.
Foster, "A Globus Primer or, Everything You Wanted to Know About Globus, But Were Afraid to Ask Describing Globus Toolkit Version 4," Draft, May 8, 2005, 69 pages.
Foster et al., "The Physiology of the Grid an Open Grid Services Architecture for Distributed Systems Integration," Globus Alliance Technical Report, 2002, 31 pages.
Foster et al., "Grid Services for Distributed System Integration," IEEE Computer 2002, Jun. 2002, pp. 37-46.
Kephart et al., "The Vision of Autonomic Computing," Computer Magazine, IEEE Computer Society, Jan. 2003, pp. 41-50.
RSA Federated Identity Manager, "RSA Secured Implementation Guide for XML Gateway/Firewall Products," Version 4.3, Jun. 9, 2005, 6 pages.
Sonic Software Corporation et al., "A New Service-Oriented Architecture (SOA) Maturity Model," White Paper Released Oct. 27, 2005, 28 pages.
Barbash, "Forum Systems XWall Web Services Firewall a Solid Security Solution," WSJ: Product Review, Forum Systems, Web Services Journal, Oct. 2004, 1-2.
Ballinger et al., "Web Services Metadata Exchange (WS—MetadataExchange)," 2004, 22 pages.
Bajaj et al., "Web Services Policy Attachment (WS—PolicyAttachment)," Version 1.2, Mar. 2006, 29 pages.
Layer 7 Technologies, "XML Appliances for SOA and Web 2.0," 2006, 2 pages.

(56) References Cited

OTHER PUBLICATIONS

Steel et al., "Core Security Patterns," Prentice Hall & Sun Microsystems, Fig. 8-4 entitled Security Patterns and Their Relationships, Dec. 2005, 1 page.
Office Action issued May 3, 2012 in U.S. Appl. No. 12/280,885.
Nair et al., "Secure Web Service Federation Management Using TPM Virtualisation," ACM, SWS '07, Nov. 2, 2006, pp. 73-80.
Steven M. Bellovin, "Distributed Firewalls", Nov. 1999 issue of ;login, appeared as pp. 37-39 (10 pages).
Basic TrustCom reference implementation, Deliverable 19, Sep. 2005, Version 1.0, 186 pgs.
Berger, Stefan et al., "vTPM: Virtualizing the Trusted Platform Module", IBM T. J. Watson Research Center, NY, USENIX Association, Security '06, 15$^{th}$ USENIX Security Symposium, 16 pgs.
"Virtual Trusted Platform Module", IBM article, May 2, 2006 (4 pgs.).
TCG Generic Server Specification, Specification Version 1.0, Revision 0.8, Mar. 23, 2005, 42 pgs.
OASIS Web Services Security: SOAP Message Security 1.0 (WS—Security 2004), OASIS Standard 200401, Mar. 15, 2004, 56 pgs.
Reiner, Sailer et al., "Proceedings of the 13$^{th}$ USENIX Security Symposium", San Diego, CA, Aug. 9-13, 2004, 17 pgs.
Wenbo Mao et al., "Innovations for Grid Security from Trusted Computing", Hewlett-Packard Laboratories, Bristol, UK; Huazhong University of Science and Technology, Wu Han, China; Oxford University Software Engineering Centre, Oxford, UK, Jun. 7, 2005, 17 pgs.
John Marchesini et al., "Experimenting with TCPA/TCG Hardware, or: How I Learned to Stop Worrying and Love the Bear", Computer Science Technical Report TR2003-476, Dec. 15, 2003, 20 pgs.
James Gosling and Henry McGilton, "The Java Language Environment", A White Paper, Sun Microsystems Computer Company, Oct. 1995, 86 pgs.
Web page "The Xen virtual machine monitor", University of Cambridge Computer Laboratory, 2008 (2 pgs.).
"Xen ups the security ante", 2006, (2 pgs.) downloaded from www.vnunet.com/articles/print/2137789.
Bruce Schneier, Crypto-Gram Newsletter, Aug. 15, 2002, 10 pgs. Retrieved from http://www.schneier.com/crypto-gram-0208.html.
"Trusted Computing", Wikipedia, Retrieved from http://en.wikipedia.org/wiki/Trusted_Computing, Jan. 12, 2007, 11 pgs.
Web page—"Trusted Computing" Frequently Asked Questions, Version 1.1 (Aug. 2003), 16 pgs. Retrieved from http://www.cl.cam.ac.uk/~rja14/tcpa-faq.html.
Roger L. Kay, President, Endpoint Technologies Associates "Trusted Computing is Real and it's Here", Jan. 29, 2007, 6 pgs.
Microsoft White Paper entitled "Trusted Platform Module Services in Windows Longhorn", Apr. 25, 2005 (10 pgs.).
Jon Oltsik, "Trusted Enterprise Security", How the Trusted Computing Group (TCG) Will Advance Enterprise Security, White Paper, ESg Enterprise Strategy Group, Jan. 2006, 13 pgs.
Christensen et al., Web Services Description Language (WSDL) 1.1, W3C Note Mar. 15, 2001, 31 pgs.
OASIS Web Services Resource Properties 1.2 (WS—ResourceProperties), Working Draft 04, Jun. 10, 2004, 52 pgs.
Box, Don et al., "Web Services Addressing (WS—Addressing)", W3C Member Submission Aug. 10, 2004, 23 pgs.
SOAP Version 1.2 Part 1: Messaging Framework, W3C Recommendation Jun. 24, 2003, 52 pgs.
Fielding, R. et al., Hypertext Transfer Protocol—HTTP/1.1 Memo, The Internet Society 1999, 114 pgs.
Berners-Lee, T. et al., Uniform Resource Identifier (URI): Generic Syntax Memo, The Internet Society 2005, 61 pgs.
Bray et al., Extensible Markup Language (XML) 1.0 (Third Edition), W3C Recommendation Feb. 4, 2004, 35 pgs.
OASIS Web Services Distributed Management: Management Using Web Services (MUWS 1.0) Part 1, OASIS Standard, Mar. 9, 2005, 30 pgs.
Tuecke, S. et al., "Web Services Base Faults (WS—BaseFaults)", Version 1.0, Mar. 31, 2004, 11 pgs.
OASIS Web Services Base Notification 1.3 (WS—BaseNotification), Public Review Draft 02, Nov. 28, 2005, 64 pgs.
Web Services Message Exchange Patterns, Draft Jul. 22, 2002, 3 pgs.
Service-oriented architecture (SOA) definition, article, Barry & Associates, date unknown, 5 pgs.
World Wide Web Consortium Suports the IETF URI Standard and IRI Proposed Standard, URI Specification Updated, IRIs Allow Internationalized Web Addressing, Jan. 26, 2005, 3 pgs.
OASIS Web Services Topics 1.3 (WS—Topics), Public Review Draft 01, Dec. 16, 2005, 39 pgs.
OASIS Web Services Brokered Notification 1.3 (WS—BrokeredNotification), Public Review Draft 02, Nov. 28, 2005, 45 pgs.
Vecellio, Gary and Thomas, Bill, "Infrastructure-based Mediation for Enforcement of Policies in Composed and Federated Applications", The MITRE Corporation, McLean, VA, date unknown, 8 pgs.
Birrell, A. D. and Nelson, B. J., "Implementing Remote Procedure Calls", Xerox Palo Alto Research Center, ACM Transactions on Computer Systems, vol. 2, No. 1, Feb. 1984, pp. 39-59.
Common Object Request Broker Architecture: Core Specification, CORBA Specification, Mar. 2004, Version 3.0-3, 1152 pgs.
CCLRC, RAL-TR-2006-009, State of the art survey on trust, security and contract management in web services and Grid computing, Mar. 2006, 441 pgs.
Ryutov, T. and Neuman, C., "The Specification and Enforcement of Advanced Security Policies", Proceedings of the Third International Workshop on Policies for Distributed Systems and Networks (POLICY '02), 2002, pp. 128-138.
Dimitrakos, T. et al., "Policy-Driven Access Control and a Distributed Firewall Architecture", Proceedings of the Third International Workshop on Policies for Distributed Systems and Networks (POLICY '02), 2002, pp. 228-231.
Office Action mailed Jan. 17, 2013 in U.S. Appl. No. 12/280,885.
Dimitrakos, T., "Research Challenges for the Convergence of SOA Platforms and Next Generation Networking," British Telecommunication plc, 2007, 24 pages.
Djordjevic et al., "Virtualised Trusted Computing Platform for Adaptive Security Enforcement of Web Services Interactions," 2007 IEEE International Conference on Web Services (ICWS 2007), 8 pages.
Maierhofer et al., "Extendable and Adaptive Message-Level Security Enforcement Framework," In Proceedings of the International Conference on Networking and Services, (ICNS '06), Jul. 2006, ISBN: 0-7695-2622-5, 10 pages.
Figueiredo et al., "Resource Virtualization Renaissance," IEEE Computer Magazine, May 2005, pp. 28-31.
Jiang et al., "SODA: A Service-On-Demand Architecture for Application Service Hosting Utility Platforms," Proceedings of the 12$^{th}$ IEEE International Symposium on High Performance Distributed Computing (HPDC'03), 10 pages.
Mao et al., "Daonity-Grid Security with Behaviour Conformity from Trusted Computing," In Proceedings of the First ACM Workshop on Scalable Trusted Computing, ISBN: 1-59593-548-7, Nov. 3, 2006, pp. 43-46.
Creasy, R.J., "The Origin of the VM/370 Time-Sharing System," IBM J. Res. Develop., vol. 25, No. 5, Sep. 1981, pp. 483-490.
Goldberg, Robert P., "Survey of Virtual Machine Research," IEEE Computer Magazine, Jun. 1974, pp. 34-45.
Nanda et al., "A Survey on Virtualization Technologies," Research Proficiency Report, Stony Brook, ECSL-TR-179, Feb. 2005, pp. 1-42.
Leiva et al., "A Grid Computing for Online Games," In proceedings of Game Design and Technology Workshop 2006 (GDTW'06), Nov. 2006, pp. 1-5.
Notice of Allowance mailed Jul. 31, 2013 in co-pending U.S. Appl. No. 12/594,045.
Office Action mailed Aug. 16, 2013 in co-pending U.S. Appl. No. 12/280,887.

\* cited by examiner

| Web Service EPR | Group Membership Tokens |
|---|---|
| WS1(A) | $T_{ws1(A)-g1}$; $T_{ws1(A)-g2}$ |
| ......... | |
| WSN(A) | $T_{wsN(A)-g1}$ |

Figure 3

COMPUTER NETWORK RUNNING A DISTRIBUTED APPLICATION

This application is the U.S. national phase of International Application No. PCT/GB2008/001077 filed 28 Mar. 2008, which designated the U.S. and claims priority to EP Application No. 07251420.1 filed 30 Mar. 2007, the entire contents of each of which are hereby incorporated by reference.

BACKGROUND

1. Technical Field

The present invention relates to a computer network and a method of operating a computer network.

2. Related Art

The advent of the Internet has meant that it is now much more common for groups of computers to co-operate with one other in some sort of common endeavour. Examples include distributed application programs, different parts of which run on different computers connected to the computer network. The most widely-researched distributed application programs are programs which integrate 'Web Services' running on different computers. 'Web Services' are one example of components that might be assembled in accordance with a 'Service Oriented Architecture'. Other known technologies might be used in place of Web Services—e.g. Enterprise Java Beans or components constructed in accordance with the Common Object Request Broker Architecture.

There is a need for security in such systems. This is especially true of inter-enterprise distributed application programs where computers in one enterprise co-operate with computers in a different enterprise. Whilst an enterprise's system administrator might trust computers administered by that enterprise not to behave maliciously, he is much less likely to trust computers administered by another enterprise to do so.

One important safeguard against malicious operation is operating each computer participating in running a distributed application to respond to receiving a message claiming to be from another participating computer by first verifying the authenticity of that claim before acting upon the message. Should the authenticity of the claim be found to be in doubt, then the receiving computer might do nothing or issue an alert to the system administrator.

Authentication is often provided using so-called credentials—most commonly a digital certificate digitally signed by a trusted authority. A problem with such credentials is handling their revocation. Conventionally this is done using Certificate Revocation Lists which a person receiving a certificate is expected to check prior to relying on that certificate. Alternatively, or in addition, the lifetime of certificate can be made short so that a certificate which is not renewed quickly becomes invalid in any case.

Returning to authentication in distributed applications, whilst it would be possible to require the computer sending the message to authenticate itself individually, it is often sufficient to have the computer sending the message to authenticate itself as a participant without specifically indicating which of the participant computers it is. This provides a more scalable method of authentication.

The applicant's co-pending European patent application 06251031.8 suggests a group authentication scheme where membership of the group is expanded by existing members sending an invitation including an unique identifier for the recipient signed by the group private key. Should the recipient meet local policy requirements for joining the group and prove to have an invitation signed by an existing member then they too will be given the group private key. They will then be able to authenticate themselves as members of the group in subsequent message exchanges by encrypting messages using the group private key and providing a certificate which certifies the group public key. In preferred embodiments, the group certificate is personalised and includes an identification of the group member.

As with all schemes involving 'certificate revocation lists', the problem arises that the security of the whole system then additionally depends on the security of whatever protocol is used to store such lists and transmit information from such lists to the point of use.

Two of the present inventors have worked on the EU's TrustCOM project. Deliverable 19 from that project was the Basic TrustCOM reference implementation. The same two inventors contributed to a paper entitled "Dynamic Security Perimeters for Grid-enabled Collaboration" at the UK Workshop on Grid Security Experiences, Oxford $8^{th}$ and $9^{th}$ Jul. 2004. One of those two inventors contributed to another paper, entitled "Multilayer Privilege Management for Dynamic Collaborative Scientific Communities" at the same workshop. The two inventors also contributed to a paper entitled "Dynamic Security Perimeters for Inter-Enterprise Service Integration" published in the journal Future Generation Computer Systems, vol. 23, no. 4, 2 Feb. 2007. This earlier work relates to securely integrating instances of resources that are distributed around a network environment, such as instances of applications installed in different servers that are brought together in a logical group in order to execute a composite service or a distributed process.

The inventors have realised how the security of such systems can be further improved.

BRIEF SUMMARY

According to the present invention, there is provided a computer network comprising a plurality of local components, a group of which interact by passing messages between them in order to perform a distributed application, in which one or more of said computers comprises:

a local-component-hosting execution environment arranged in operation to execute one or more local components of the distributed application;

a group membership token handler in a separate execution environment including a group membership token store storing one or more group membership tokens for said local distributed application components and information indicating which components are entitled to include the group membership tokens in their messages, said group membership token handler being arranged in operation to intercept one or more message transmissions from a local components to other computers in said network, to find whether the message-sending local component is entitled to include a group membership token asserting membership of the group with the message, and to include the group membership token with the intercepted message if said local component is entitled to the group membership component;

a group membership controller providing an interface that enables a token authority to update said group membership token store in order to change which local components are entitled to have a group membership token including with one or more messages.

By providing a separate execution environment which includes group membership tokens with distributed application messages sent by components of that distributed application provided a group token membership store includes a group membership token indicated to be available for the sending component, and providing a token authority with an interface enabling the group token membership store to be updated, a method of controlling group membership which provides more secure group membership verification than has hitherto been achieved is enabled.

The separate execution environments could be different computers in said computer network, but preferably the separate execution environments are in different partitions or virtual machines hosted on the same computer.

By placing the group membership token handler on the same computer as the local component, but having the two execute in different virtual machines, the security benefits of isolating the local component from the group membership token handler are maintained whilst the power and amount of equipment required to provide a computer network supporting the distributed application are reduced.

Preferably, the virtual machines provide one or more virtual cryptoprocessor functions.

Then, by using encryption based on keys stored exclusively in said virtual machine, message security (i.e. one or more of message confidentiality, integrity, authenticity and non-repudiability) can be further improved.

Preferably, said group membership tokens comprise personalised group membership tokens.

BRIEF DESCRIPTION OF THE DRAWINGS

There now follows, by way of example only, a description of a specific embodiment of the present invention. The description refers to the attached drawings in which:

FIG. 3 shows a group token membership data structure stored in a group token handling partition;

DETAILED DESCRIPTION OF EXEMPLARY EMBODIMENTS

Figure 1:
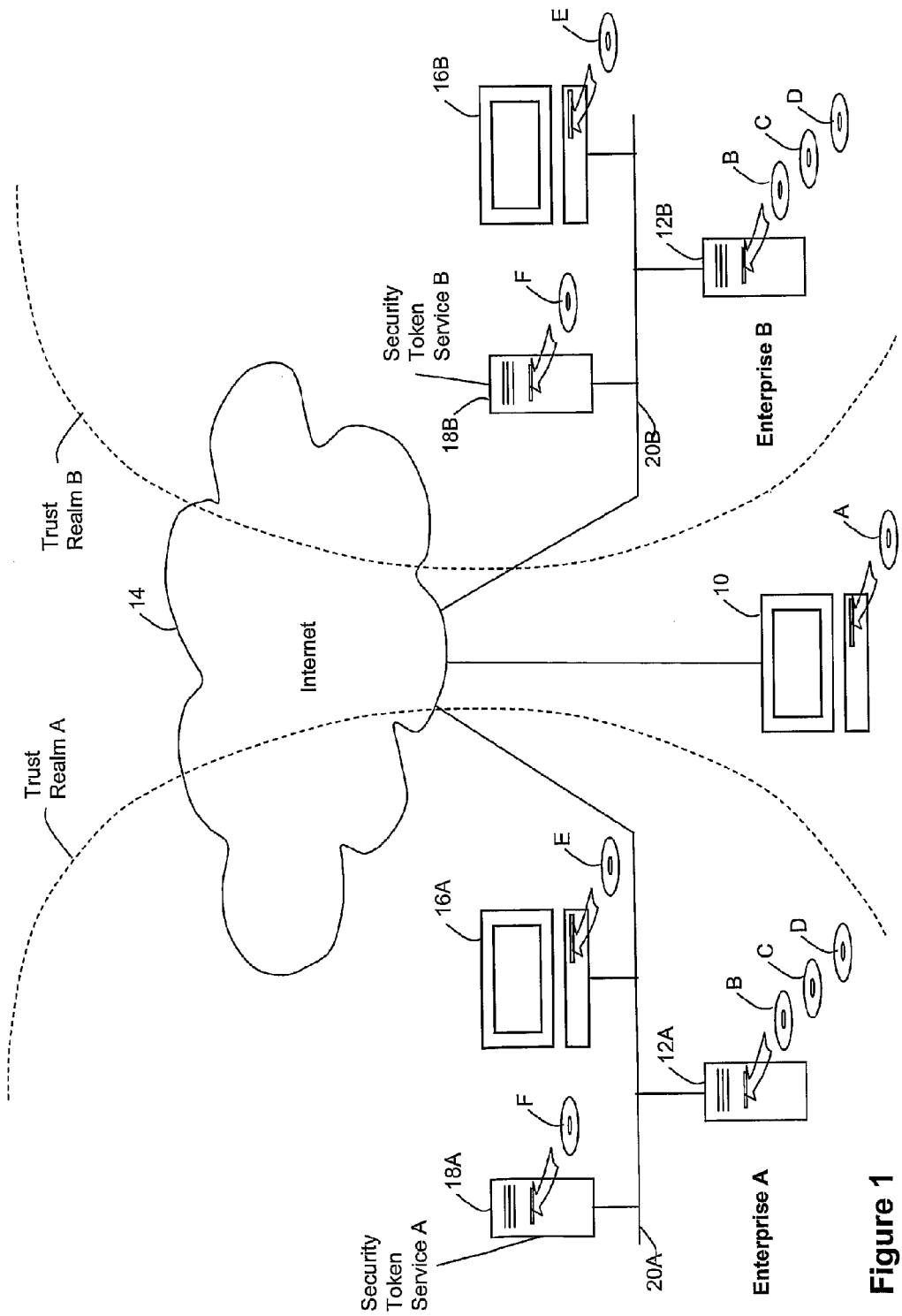
FIG. 1 shows a group of web server computers co-operating to form a virtual organisation in order to perform a service for a customer interacting with that virtual organisation using his personal computer.

FIG. 1 shows an example of a computer network which implements a first embodiment of the present invention. The computer network includes a customer's PC 10 which can be connected to a first enterprise's web server computer 12A via the Internet 14. The first enterprise's server is in turn connected to an administration computer 16A and a utility services server computer 18A by a private network 20. The web server computer 12A includes Trusted Platform Module hardware as described in the Trusted Computing Group's 'TCG Generic Server Specification' version 1.0. Enterprise A's computers and its favoured security token service computer 22A are regarded as belonging to a first trust realm A.

The customer's PC 10 is provided with browser software which enables the customer to interact with the web-server 12A. A browser might be installed from CD-ROM A. Such browser software is well known and will not be described further.

The first enterprise's web server computer 12A is provided with virtualization software like the open source Xen hypervisor available from www.xensource.com which supports a virtual TPM implementation (as disclosed in IBM Research Report RC23879—'vTPM: Virtualizing the Trusted Platform Module') and further discussed in the web-page 'Virtual Trusted Platform Module' found at http://domino.research.ibm.com/comm/research_projects.nsf/pages/ssd_vtpm.index.html Alternatively, software as disclosed in US Patent application 2005/0246552 might be provided. As yet another alternative, the software disclosed in international patent application WO 2006/011943 might be used.

Such virtualisation software is installed on the web server 12A from CD-ROM B. Installation of this software has the result that the Trusted Platform Module's secure storage and cryptographic functions are available to each virtual machine created on the web server 12A.

A similar set of computers (12B, 16B, 18B) provided with similar software and belonging to enterprise B are also connected to the Internet 14. Enterprise B's computers are regarded as belonging to a first trust realm B.

Figure 2:
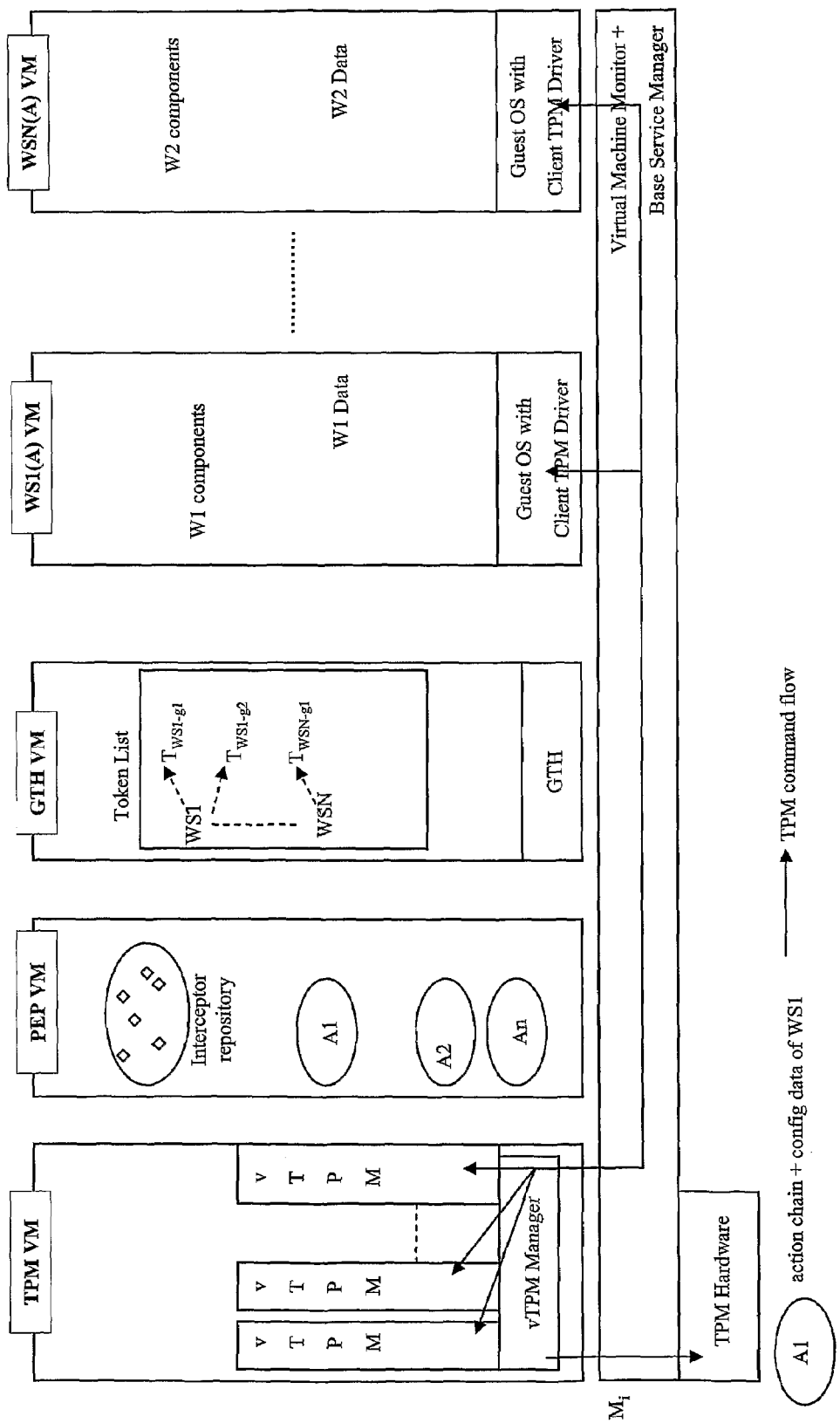
FIG. 2 shows how each web server is virtualised to provide a plurality of partitions.

Referring to FIG. 2, the installation of the virtual TPM software initially generates a Virtual Machine Monitor and a Base Service Manager that controls the setting up of further virtual machines. The Base Service Manager has the information to authenticate each virtual machine and (by matching the keys-related information) can control access to/from different virtual machines.

The Base Service Manager provides an administration interface. It will be understood that this interface might be used by an administrator using administration computer 16A to manipulate the operation of the web server 12A. The Base Service Manager provides TCP/IP communications stack software which receives messages from and transmits messages to one or more network interface cards that each Web Server 12A, 12B computer has. As a consequence, all incoming and outgoing messages are exposed to the Base Service Manager. These messages are sent between the computers using the HyperText Transfer Protocol. The Base Service Manager recognises HTTP requests and responses which contain XML and extracts the XML from such messages—it will be understood by those skilled in the art that handlers which convert HTTP requests and responses to XML are well-known.

Thereafter, the computer's administrator creates a Policy Enforcement Point virtual machine (PEP VM) and a Group Token Handler virtual machine (GTH VM). The setting up of the other virtual machines seen in FIG. 2 (WS VM) will be explained below in relation to the deployment of a distributed application which combines web services running on web servers 12A and 12B).

The Group Token Handler virtual machine stores a table (initially empty) which lists, for each web service instance on the web server, group membership tokens available to each web service. In the example shown in FIG. 3, web service WS1 has group membership tokens for groups g1 and g2, whereas web service WSN has group membership tokens for group g1 only. The way in which group tokens are added to the table will be described below with reference to FIGS. 5A and 5B. The way in which group tokens are removed from the table (and thereby revoked) will be described below with reference to FIG. 6.

Having set up the PEP VM one or more message handling programs (referred to as 'interceptors' or 'handlers' in the present embodiment) are installed on that virtual machine from CD-ROM C. The security programs include a core enforcement component to which the Base Service Manager passes all XML messages arriving at the server computer 12A. The core enforcement component includes an XML processor able to process an XML stream (in this embodiment the XML processor is provided by the SAX software package).

The computer's administrator then loads, from CD-ROM D, code for the various local interceptors used in processing incoming or outgoing SOAP messages onto an interceptor repository stored within the PEP VM.

Having a PEP virtual machine shared by multiple virtual machines running web service components for different distributed applications leads to a reduction in the amount of storage space required at the node since those routines need only be stored once rather than on each separate virtual machine. Since a library of such routines must include routines for all the routines which might be called, this represents a significant memory saving.

In general, an important advantage of the use of separate virtual machines relates to the containment of interference, and separation of concerns between PEP, GTH and WS partitions. This allows for different a substantially strong form of access and execution separation between these partitions. Consequently an WS administrator or the WS code itself will not be able to interfere with the PEP partition. Similarly an infrastructure administrator will not be able to directly or indirectly access or interfere with the group tokens or the application code and a collaboration manger will not be able to directly or indirectly access the PEP handlers or chain or the WS code.

Furthermore different operating systems & can be used for executing PEP or WS application or for storing group tokens.

As described by the adaptive enforcement architecture that has been presented in the TrustCOM deliverables D19 and D29-35-36 before a SOAP message is delivered to a web service instance, it is passed through a number of Policy Enforcement Points (PEPs). PEPs are responsible intercepting the message and for enforcing series of enforcement actions in compliance with some configuration policy. This process could include for example, checking the signature, performing decryption of certain parts of the message, verifying the content of the message, checking for the presence of group tokens etc. The message is delivered to the recipient only after the PEP verifies that the message complies with the PEP configuration policy. The enforcement actions that the PEP needs to perform are implemented by SOAP Interceptors and can be sequentially grouped together into something called interceptor chains. The enforcement process is based upon the composition of interceptor chains which is a process based on the amalgamation of the message content analysis and the security requirements of the protected resource derived form the configuration policy. Based on the outcome of this fusion the selected interceptors are inserted into the chain. The interceptors in a chain may be deployed locally or they can be distributed over the network and be invoked remotely. In the present example, the PEP virtual machine is loaded with software providing such a Policy Enforcement Point.

The administration computer 16A has a Web-Service Distributed Management implementation such as Apache MUSE or any other implementation that supports WSDM protocol stack (e.g. IBM Websphere, CA WSDM) or the WS-Management stack (e.g. Microsoft .NET WSE) installed upon it from CD-ROM E (it will be realised that WS is a common abbreviation for Web Services). This enables an administrator to load configuration files and policies into the web-server computer 12A in order to control its operation as will be described below (policies are normally more dynamic that configuration files—i.e. more frequently updated—especially they are often updated during the execution of the application they control).

Using that interface, the administrator can load policies which are not specific to a given instance of a web-service into the PEP VM. In particular, the administrator might load the interceptor reference policy (IRP), and the Utility Service Policy (USP) described in the applicant's co-pending international application WO 2006/011943.

The utility service server computer 18A is provided with software providing one or more utility services (e.g. certificate verification, security token validation) from CD-ROM F. In particular the utility service computer 18A is provided with software that enables it to act as a Security Token Service (STS).

As was mentioned above, in this example, Enterprise A collaborates with Enterprise B in order to provide the customer with a desired service. Enterprise B has a similar set of similarly programmed computers to Enterprise A. The web servers of the enterprises involved in the collaboration can provide a distributed application by sending messages between separate components which are combined together to form the distributed application.

There is a need for modern enterprises to rapidly introduce new products and services to the marketplace. This requires the ability to quickly assemble software components to provide a distributed application which provides or assists in providing the new product or service to the customer.

In the present example, these software components take the form of web services. In order to provide a platform for the introduction of web services, the administrator of each of the web server computers 12A and 12B controls the virtual TPM hypervisor software to create one or more virtual machines, each of which is intended to host a single instance of a web service. Into each of those virtual machines, the administrator loads the local components and any underlying software needed to run it. For example if the Web Service were written in Java then the administrator would also load Apache Tomcat software or Apache Axis software. If, alternatively, the Web Service were a .NET component then the administrator would also load Microsoft VStudio, or Microsoft WSE.

Once the virtual machine for the WS instance is built, the virtual TPM included with the virtual machine creates a key pair for the WS instance. The public key of this pair is then advertised as the public key of the WS instance and the private part is encrypted with the Storage Root Key (SRK) of the virtual TPM. Any data sent for the WS instance can then be encrypted with this public key. In addition, a "signature" key-pair can be created for each service instance. In general, an arbitrary number of the "crypto" material, secret(s) etc. can be created for various purposes and protected by the virtual TPM as the private key above.

The public key(s) of the key-pair(s) could be signed by the attestation key of the virtual TPM (whose key could in turn be signed by the TPM of the Base Service Manager). This is particularly useful for security auditing and traceability of the creation and management of virtual machines on the web servers 12A and 12B.

Then, at the time of deployment of the new distributed application to support the new product or service, each administrator installs the web services used in providing the service (it will be understood that these will normally differ between the two web servers) and configures those web services appropriately. It is to be understood that loading the web services into different virtual machines provides the advantage of secure isolation between several distinct exposures of a (web) service of the same type—and indeed between web services of a different type. As is well known in the art, the web services will exchange messages between them using the Simple Object Access Protocol. At the time that virtual machine is created, the service-specific policy—i.e. the Enforcement Configuration Policy in the language of the TrustCOM deliverables, will be loaded by the administrator into the PEP virtual machine using the interface provided for that purpose on administration computer 16A.

The use of the Enforcement Configuration Policy and the other policies mentioned above has the beneficial result that the behaviour of the security programs in relation to a given distributed application can be changed with immediate effect and without the need to redeploy or restart the protected resources or any other part of the system.

Figure 4:
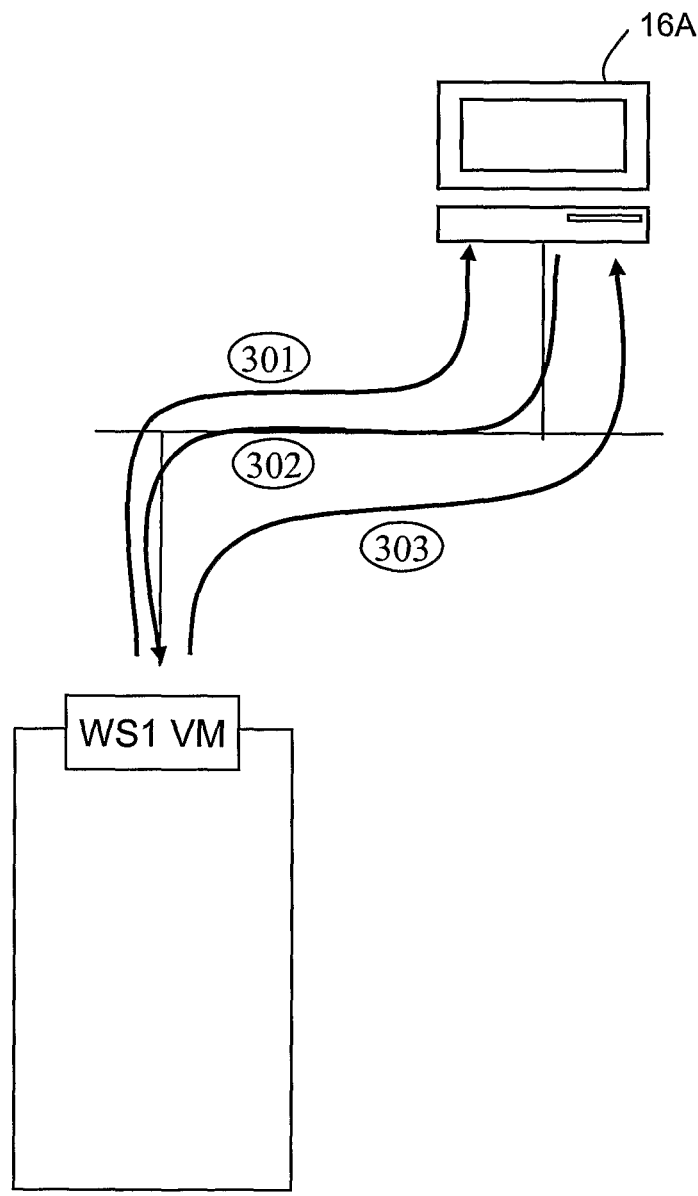
FIG. 4 shows how each web service instance can obtain an individual identity token from a local administration computer.

As part of its initial configuration, a web service partition is provided with (FIG. 4) an identity token by the administrator.

In step 301, WS1(A) VM sends a request $M_1$ to local domain administrator 16A asking for a local domain membership token. The request contains the Public key of the virtual TPM of WS1(A) VM, the end-point reference (EPR) of the web service instance and a signature on these values using the Attestation key of the virtualized TPM. Since the local administration and web service instance do not run on the same instance of Trusted Platform Module hardware, a second round of signature chain is added to the request message to prove the validity of the attestation key of WS1(A) VM's virtual TPM.

$$WS1(A) \rightarrow 16A : M_1 = Pu_{WS1(A)}, EPR_{WS1(A)},$$
$$\mathrm{Sign}\{Pu_{WS1(A)}, EPR_{WS1(A)}\}_{BSM(A)}$$

Local administration computer 16A might in turn run a challenge response protocol (step 302) to make sure that the TPM of WS1(A)'s partition does indeed own the private key of the public key supplied. If this is verified successfully, local administration computer 16A sends web service instance identity token $T_1$ back to WS1(A) (step 303).

$$T_1 : Pu_{WS1(A)}, EPR_{WS1(A)}, Pu_{ADMIN(A)}, EPR_{ADMIN(A)},$$
$$\mathrm{Sign}\{Pu_{WS1(A)}, EPR_{WS1(A)}\}_{ADMIN(A)},$$
$$\mathrm{Sign}\{Pu_{ADMIN(A)}\}_{TTP}, \text{other\_details}$$

Where:
$Pu_{WS1(A)}$—public key of WS1(A)
TTP—trusted third party—e.g. VeriSign
'other_details'—all other required details like validity time period etc.

Figure 5A:
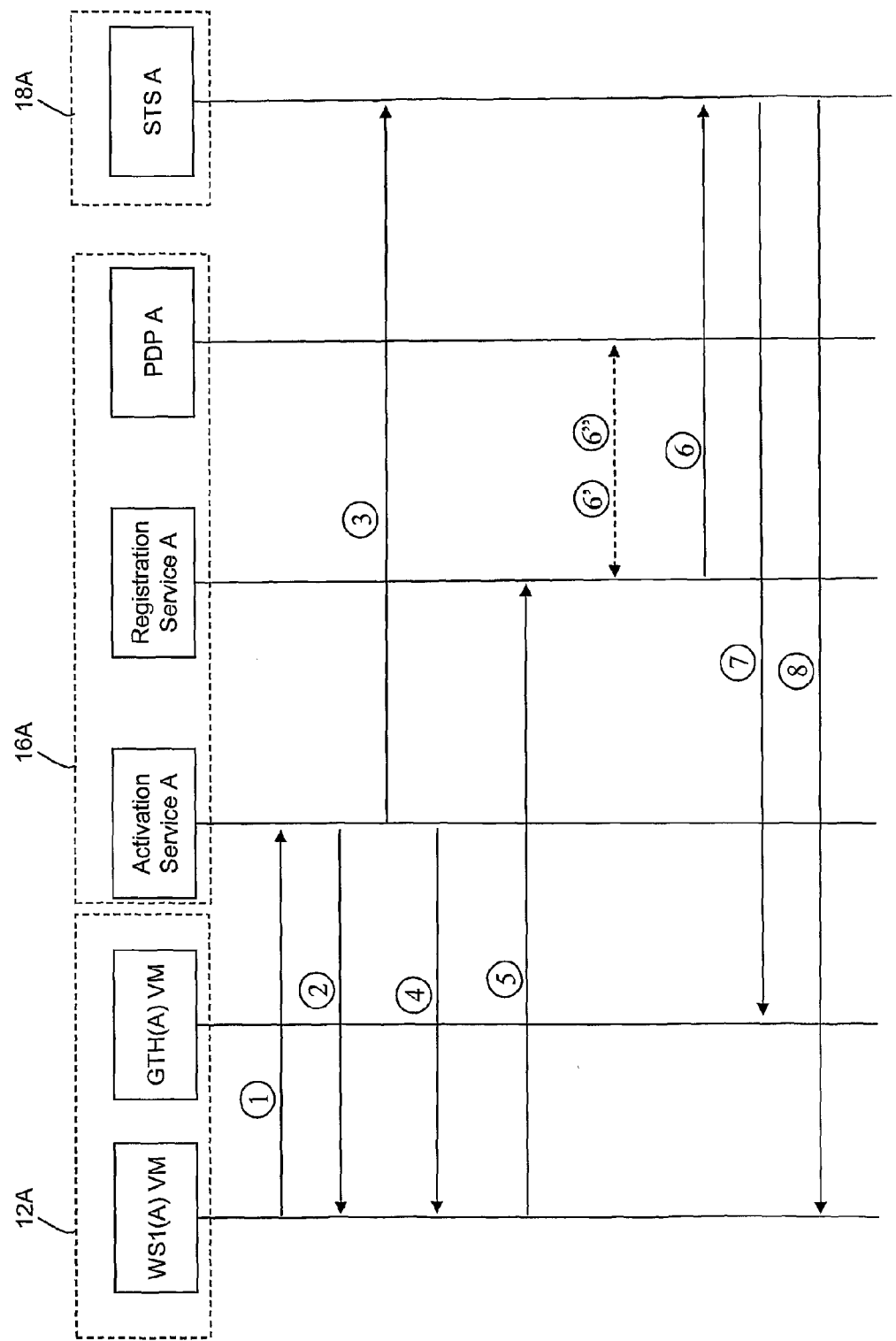
FIG. 5A shows how a web service instance can later obtain a group membership token.
Figure 5B:
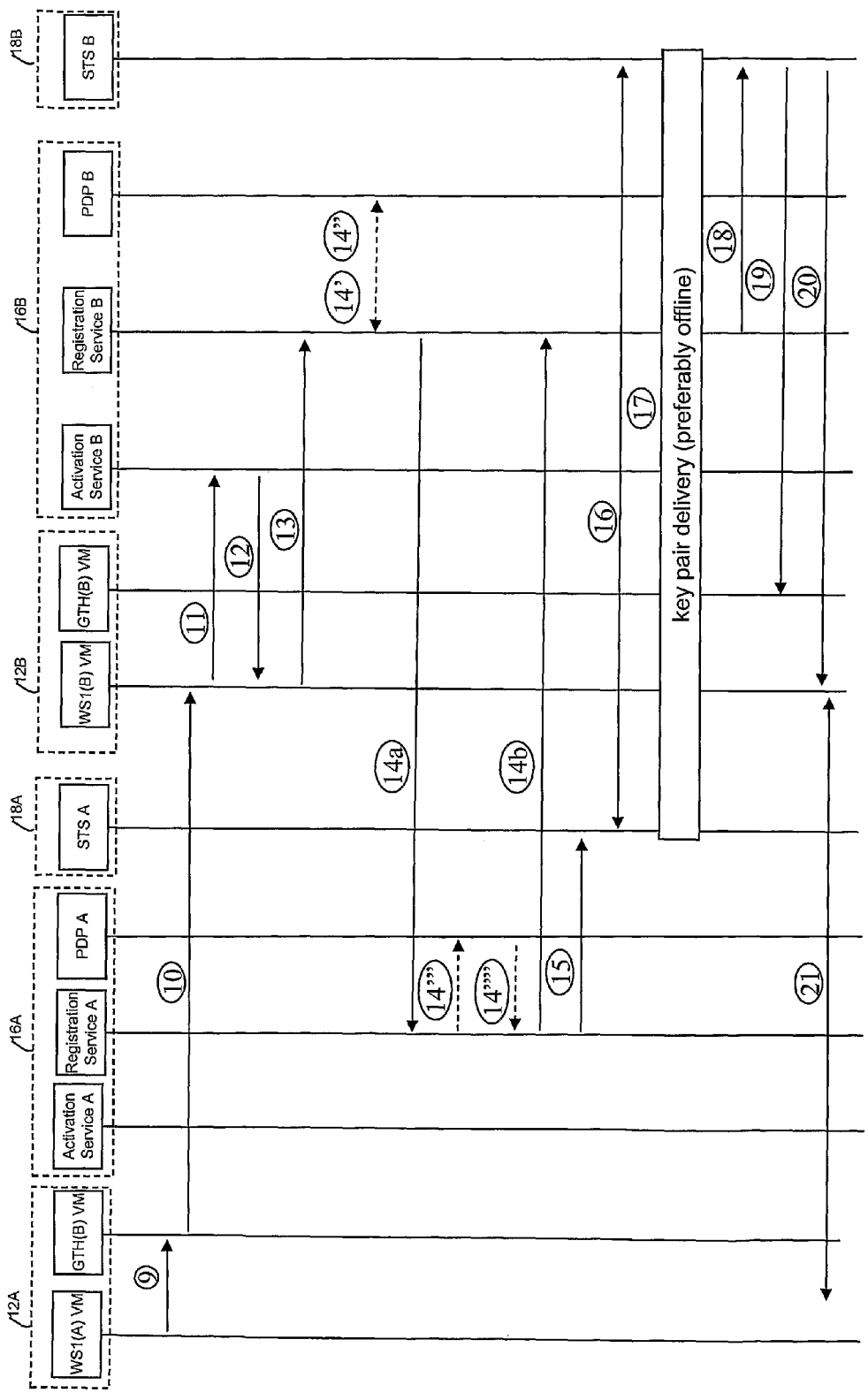
FIG. 5B shows how a web service running on the other web server can be invited to join the group and thus obtain a group membership token.

FIGS. 5A and 5B show the message exchange which results in a WS instance having a group token stored for its use in the local Group Token Handler virtual machine. In this case, the group token includes an identifier of the group participant, such as Web service ID. Those skilled in the art will be familiar with the functional blocks 'activation service', 'registration service', Policy Decision Point (PDP). The former two terms are used in accordance with the WS-Addressing standard. In this example, each of these pieces of functionality are provided on local administration computers 16A and 16B. As mentioned above, the Security Token Service functionality is provided by the utility computers 18A and 18B.

In (FIG. 5A) step 1, WS1(A) requests the activation of a new web service group by sending a message to the activation service. The identity token of WS1(A) is provided to authenticate itself at the activation service:

message 1={request,$Tws1(A)$}sign$Prws1$ (In the above expression, and in similar expressions in this description, 'Pr' is used as shorthand for 'Private Key' and is followed by a reference to the owner of that private key—in this case WS1(A). 'signPrws1(A)' indicates that the data inside the curly brackets is digitally signed using the Private Key Prws1(A). In other words, the data inside the curly brackets is digitally signed by the web service WS1(A)).

In step 2, the activation service creates a group identifier or descriptive part (GC) of a so-called security context for the group, and passes it to the web service 1. In this particular example, the group identifier is 'g1'.

In step 3, the activation service communicates with the STS A, requesting the creation of a group key pair for the new group.

message 3={GroupID,KeyPairCreateRequest, $Tws1(A)$}sign$Pra$

The Security Token Service A responds to the message by creating a group key pair for this context (Prg1/Pug1-Prg1 being a private key used by members of new group g1, Pug1 being the corresponding public key).

In step 4, the activation service returns the group identifier GC (='g1' in this case), and the address of the Registration service to the web service WS1(A) which initiated the group creation request:

message 4={GC,RegAdr}sign$Pra$

In step 5, the service WS1(A) requests registration with the context, that is participation in the group, from the Registration service:

message 4={request,GC,$Tws1(A)$}sign$Prws1(A)$

In step 6, the registration service performs a security check on the WS1(A) at the responsible STS and PDP services by presenting the identity token of WS1(A), and communicates with the STS A, requesting creation of the group token for WS1(A) (Tws1(A)-g1) and delivery of the group token Tws1(A)-g1 to GTH(A) VM and Prg1 to the service WS1(A):

| |
|---|
| message 6' = {AuthorisationRequest, Tws1(A)}signPrr |
| message 6" = {AuthorisationResponse}signPrpdp |
| message 6 = {GC, TokenCreateRequest, Tws1}signPrr |
| Tws1(A)-g1 = {GroupID, Pug1, IDws1(A),...}signPrstsA |

Note that in this case the group token contains an identifier of the service that is successfully registered with the group, as well as the public key.

In step 7, the STS A sends (either directly or via registration service), the group membership token Tws1(A)-g1 to the group token handler virtual machine. The message is digitally signed by the STS A.

message 7={$Tws1(A)$-g1}sign$PrstsA$

The group token handler receives this message, finds the relevant record in the group membership list (FIG. 3) using the web instance ID found in the group token and adds the group token to the list of group memberships associated with that web instance in that table.

In step 8, the STS A sends (either directly or via the registration service), the group private key Prg encrypted with the public key of the ws1(A) and digitally signed by the STS A.

message 8={{*Prg*}/encPuws1(*A*),GroupID, Pug1}sign*PrstsA*

Thus, the web service is provided with the group private key, whilst the group membership token is supplied to the group token handler virtual machine (GTH(A) VM). The web service WS1(A) is now a full member of the group.

FIG. 5B shows the message exchanges that take place when a web service instance (in this particular example, web service WS1(A)) on enterprise A's web-server 12A wishes to invite a web service instance (say WS1(B)) on enterprise B's web-server 12B to join a group of which WS1(A) is already a member.

At the end of step 8 above, WS1(A) had received the group identifier GC, and the group public and private key, and the Group Token Handler virtual machine (GTH(A) VM) had received a personalised group token Tws1(A)-g1 and stored it in its group membership table (FIG. 3).

In step 9, WS1(A) sends an application message to WS1(B) to pass the descriptive part of the context (GC), and the address of registration service A to WS1(B). The application message also contains an Add Group Token Request. There is no need to pass identity token of WS1(B):

message 9={{*WS1(B)*_ID}/sign*Prg,GC,RegAdrA*,Add Group Token Request}

As will be explained in more detail with reference to FIGS. 7A and 7B, outgoing SOAP messages from web service instance virtual machines are intercepted by the Policy Enforcement Point virtual machine. Where, as in this case, the SOAP message includes an Add Group Token Request, the GTH virtual machine will check using the group membership table (FIG. 3) whether the web service sending the message is a member of the group and add a Group Token to the message if it is a member. In step 10, the message is then forwarded to the original addressee, in this case WS1(B).

message 10={{WS1(*B*)_ID}/sign*Prg,GC,RegAdrA*, *Tws1(A)-g1*}

In Step 11, the WS1(B) is configured to use a different coordination service, it sends request to the activation service B. This is different from the initial message 1 (FIG. 5A) from WS1(A), as it contains the group context GC, created by Activation Service A and received from WS1(A). In step 12, activation service B returns the same GC, and provides the addresses for registration service B. The address of Registration Service A is received by WS1(B) from WS1(A), and is therefore passed to the registration service B with the registration request.

message 11 = {request, {WS1(B)_ID}/signPrg, GC, Tws1(A)-g1}/signPrws1(B)
message 12 = {GC, RegAdrA, RegAdrB}signPrab There is no need for Activation Service B to contact the STS B at this stage (as happened with message 3 for the actions of WS1(A)), since the key pair for the group already exists and will be delivered to STS B in one of the following steps.

In step 13, WS1(B) sends a registration request to the registration service B using the address received from activation service B in step 12. The address of registration service A is also transmitted:

message 13={request,*GC,RegAdrA,Tws1(B)*}/sign-*Prws1(B)*

In step 14 the Registration Service B communicates with the PDP B to verify that WS1(B) is authorised to join the group:

message 14' = {AuthorisationRequest, Tws1(B)}signPrrb
message 14" = {AuthorisationResponse}signPrpdpb If this is okay, the registration service B registers with the registration service A as interposed, on behalf of the service WS1(B):

message 14*a*={request,*GC,Tg,Tws1(B),Trb*}/sign*Prrb*

The registration service A then communicates with the PDP A to verify that it can accept the interposed registration:

message 14''' = {AuthorisationRequest, Tws1(B), Trb}signPrra
message 14'''' = {AuthorisationResponse, Trb}signPrpdpa If this is okay, the Registration service A responds. However, the private key for the group is sent to the STS B in a separate communication (messages 16-18 below).

If there is a requirement to additionally guarantee the integrity and non-repudiation of the interactions between WS1(B) and registration service B (i.e. between a participant of the interposed registration service and the interposed registration service), then the original message 13 should be co-signed by registration service B, in order to form message 14*b*:

message 14*b*={message 10}/sign*Prrb*

In step 15, the registration service A communicates with the STS A to pass the key pair for the group to the STS B:

message 15={*GC*,KeypairDeliverRequest,*Tws1(B)*}sign*Prra*

If not already completed, federation between realms A and B needs to be established at this point in step 16 so that delivery of the group private key to WS1(B) can take place.

In step 17, the key pair for the group is delivered from STS A to STS B; it is stored at STS B to be used as a part of the group token for every service from trust realm B that needs to join the group.

In step 18, after performing security check on the WS1(B) at the responsible STS and PDP services, registration service B communicates with the STS B, requesting creation of the group token for WS1(B) (Tws1(B)-g1) and delivery of Tws1(B)-g1 to the group handler virtual machine GTH(B) VM on enterprise B's web-server and the group private key Prg to WS1(B).

message 18 = {GC, TokenCreateRequest, Tws1(B)}signPrrb
Tws1(B)-g1 = {GroupID, Pug, IDws1(B),...}signPrstsb Note that Tws1(B)-g1 contains an identifier of the service that is successfully registered with the group.

In step 19, The STS B signs and returns the personalised group token Tws1(B)-g1 to the Group Token Handler VM (GTH(B) VM) on enterprise B's web server 12B.

message 19={{*Tws1(B)-g1*}sign*Prstsb*

The group token handler makes an entry in its group membership list which records the fact that WS1(B) is a member of group g1.

In step 20, the STS B signs and returns the private group key Prg encrypted with the public key of the WS1(B) to the web service instance WS1(B).

message 20={{*Prg*}/*encPuws*1(*B*)}sign*Prstsb*

The second web service WS1(B) is then also a full group participant of group g1, and group communication at the application-level can take place between group participants, protected with the security context. Each message also includes the corresponding group token, allowing for peer authentication. The message below is directed from WS1(A) to WS1(B):

message 21={{data}/*encPug*\*,*Tws*1(*A*)-*g*1}

If a service WS2(B) from realm B wants subsequently to join the group, messages 14, 15, 16 and 17 do not happen, as WS2(B) can be registered with registration service B and receive a private key from STS B and GTH(B) VM can receive a personalised group token Tws1(B)-g1 from the STS B.

Figure 6:
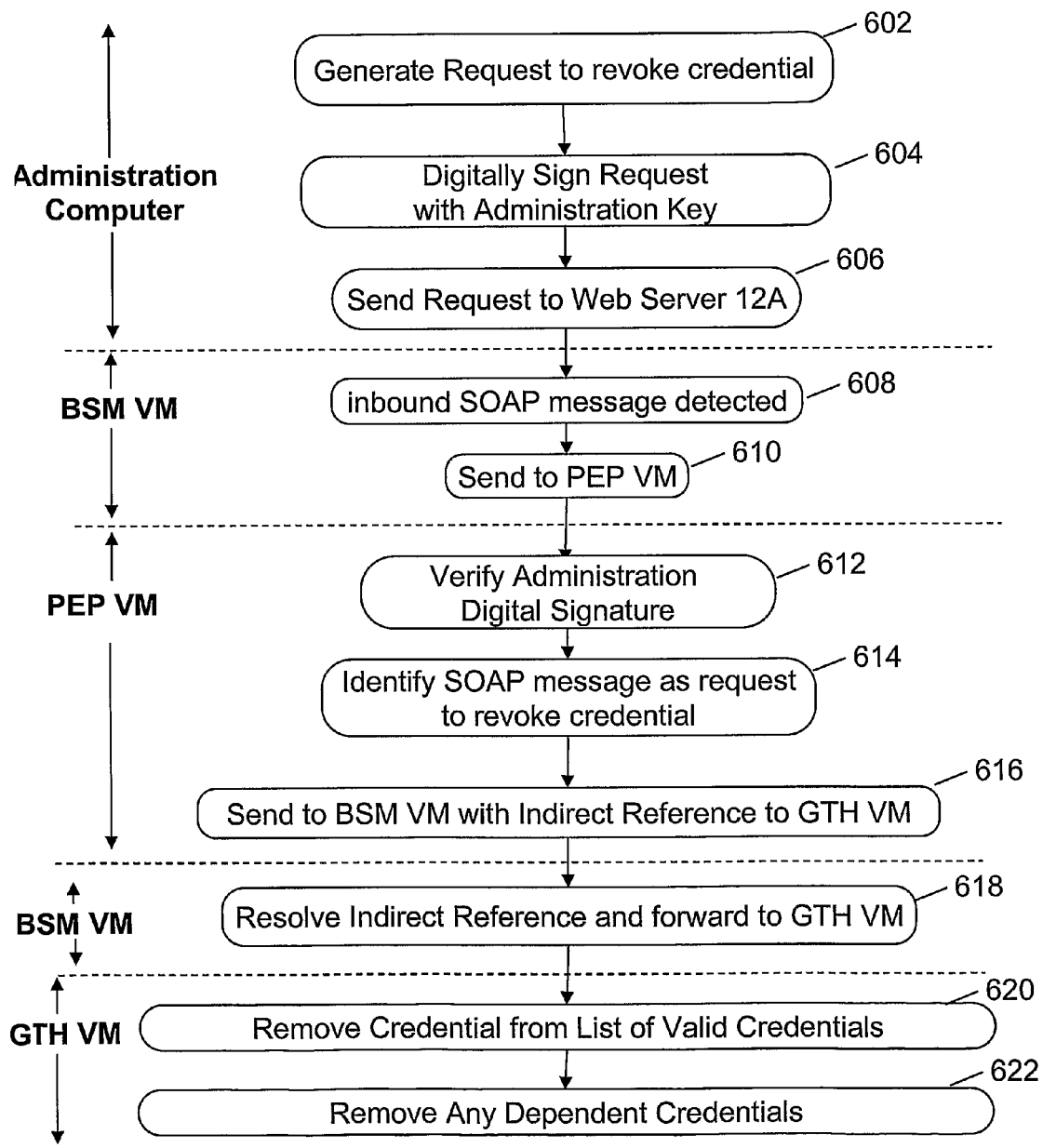
FIG. 6 shows the processes involved in revoking a group membership token after it has been issued.

FIG. 6 shows how an administrator can revoke a credential which has been issued to a web service in the trust realm which the administrator administers.

Software on the administration computer 16A, 16B provides a graphical user interface which allows the administrator to select a personalised group membership token to be revoked. A request to revoke that group membership token is thus generated (step 602). The request includes an identifier for the web service instance and the personalised group membership token.

The revocation request is then signed with the administrator's private key (step 604) and sent (step 606) to the web server 12A.

At the web server, the revocation request is received and passed to the Base Service Manager virtual machine. The Base Service Manager virtual machine detects (step 608) the arrival of a SOAP message and forwards (step 610) it to the Policy Enforcement Point virtual machine.

The Policy Enforcement Point verifies (step 612) the administrator's signature on the revocation request, identifies (step 614) the request as a revocation request and then passes (step 616) the message back to the Base Service Manager virtual machine, giving an indirect address for the group token handler virtual machine (GTH VM).

The Base Service Manager then resolves that indirect address into a genuine internal address and forwards the revocation request to the group token handler virtual machine (step 618).

The Group Token Handler virtual machine then reads the web service instance and personalised group membership token from the revocation request, and deletes (step 622) the corresponding entry from its group membership list (FIG. 3) if such an entry is present.

Figure 7A:
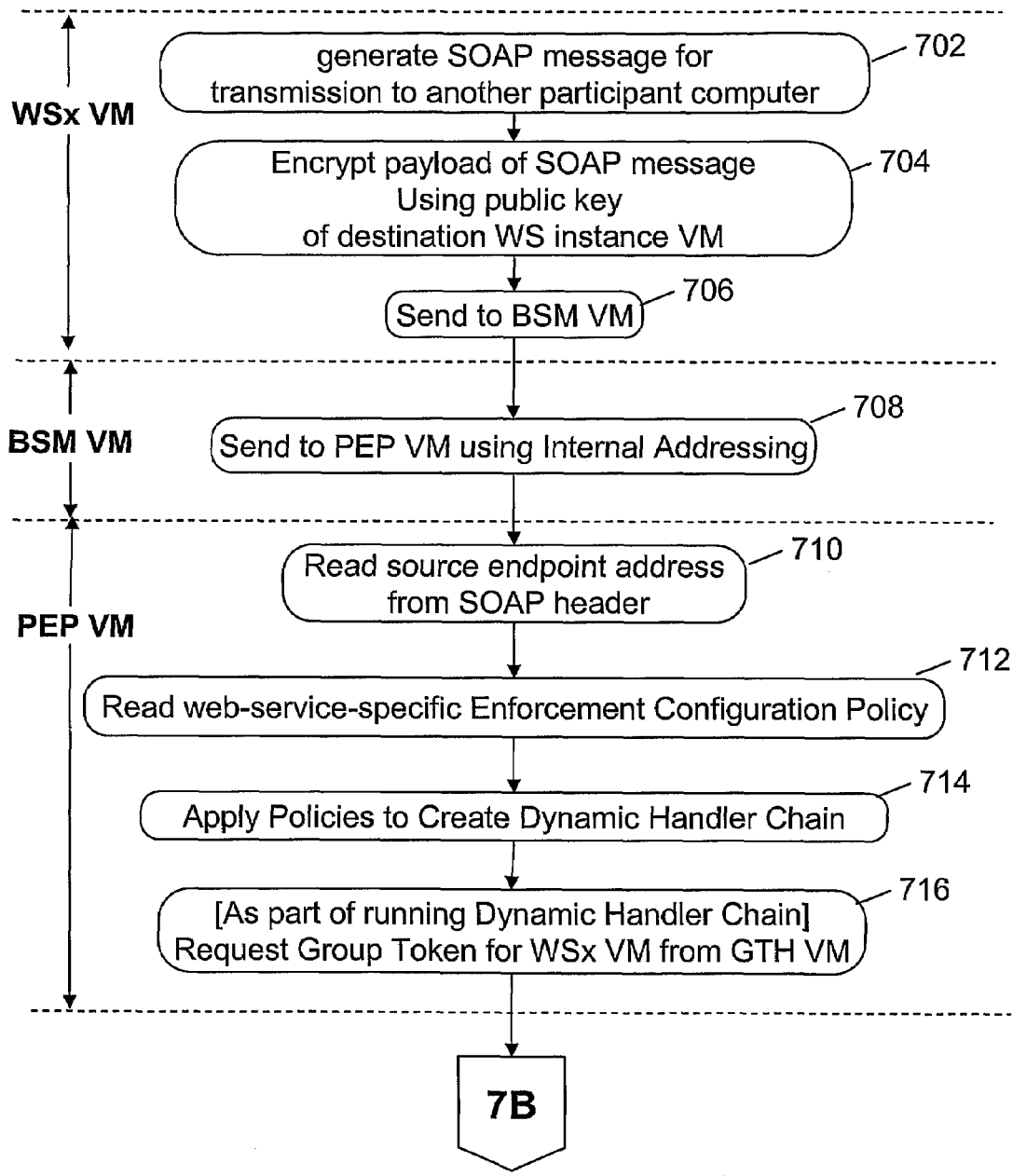
FIGS. 7A and 7B shows the steps involved in applying a group membership token to a message sent by a member of the group.
Figure 7B:
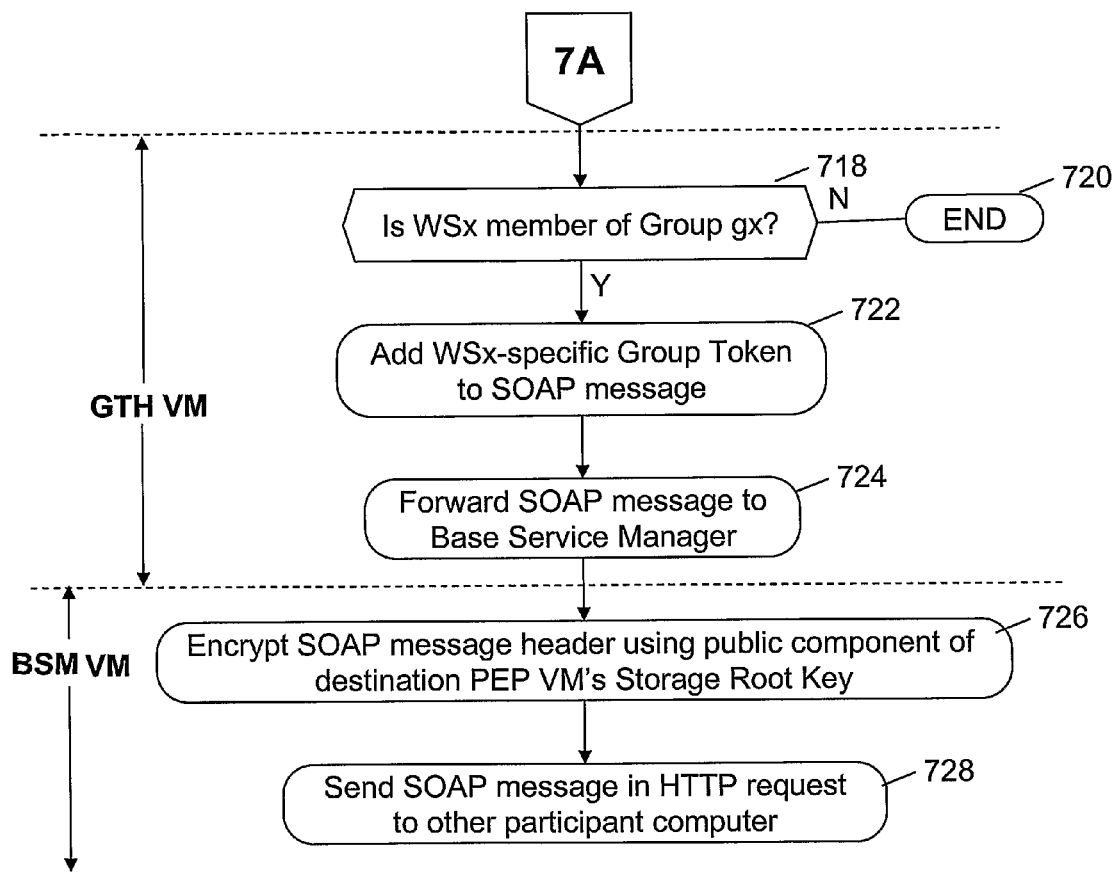

FIGS. 7A and 7B show the message exchange and processing that takes place when a web service instance attempts to send a message to a member of a group of web service instances (i.e. it shows the message processing that takes place each time a message like message 21 in FIG. 5B is sent).

Initially the web service instance creates (step 702) a SOAP message which is for sending to another web service which co-operates in the performance of some distributed application. The SOAP message includes, in its header, a group identifier which identifies the group which corresponds to the web services involved in this particular distributed application. Having generated the message, the web service instance encrypts (step 704) the payload of the message using a public key which is itself generated by the virtual TPM functionality of the destination web service instance virtual machine. The partially-encrypted message is then sent (step 706) to the Base Service Manager.

The Base Service Manager forwards the message to the Policy Enforcement Point virtual machine (step 708).

On receipt by the Policy Enforcement Point virtual machine, the PEP VM reads the end-point reference from the SOAP message header (step 710), finds the appropriate Enforcement Configuration Policy and creates (step 714) a dynamic handler chain in which a sequence of handlers, selected and ordered in accordance with that policy are used to process the message.

In the present embodiment, the handlers at the end of the chain is a handler which seeks to add a group membership token (for the group identified in the header of the SOAP message) to the outgoing message. This handler generates a request (step 716), indirectly addressed to the Group Token Handler virtual machine for a group token to be added to the outgoing message. That request includes the group identifier found in the header of the SOAP message.

On receiving the request, the group token handler virtual machine looks in its group membership list (FIG. 3) for the web service instance from which the SOAP message originates, to see whether a group membership token for the group in question is present.

If no such token is present, then it cannot be added to the message and the handler terminates (step 720). If the token is present, then it is added to the message (step 722). The outgoing message is then forwarded to the Base Service Manager (step 724) which encrypts the SOAP message header using the destination PEP VM's public key (step 726) and sends (step 728) the encrypted SOAP message as the payload of an HTTP message sent to the IP address of the other web server.

Those skilled in the art will see how the above embodiment further provides a secure segmentation of the policies, security tokens and processing mechanisms that are executed within the scope of a policy enforcement engine on a server (or an application firewall, or a gateway) that intercepts messages, identifies contextual information (e.g. federation contexts) and executes the message processing in accordance with the appropriate policies and within the scope of a segregated process that is associated with the federation context. The use of a trusted computing platform provides state segregation and process isolation within the internal processing of each policy enforcement engine, gateway or firewall.

Many variations on the above embodiment are possible. These include (but are not limited to):

i) in the above embodiment group membership was expanded using a mechanism which builds on that put forward in our co-pending European patent application 06251031.8. However, other group membership control mechanisms such as the Internet Engineering Task Force's 'Simple Public Key Infrastructure'—SPKI and WS-Federation;

ii) in the above embodiment, there was one group token handler virtual machine on each computer, and one Policy Enforcement Point virtual machine—both of these being shared by all the web-service hosting virtual machines. In other embodiments, a separate group token handler virtual machine could be provided for each web-service hosting virtual machine. In yet other embodiments, a separate group token handler machine and policy storing virtual machine could be provided for each web-service hosting virtual machine. In yet still further embodiments, a separate separate group token handler machine, policy storing virtual machine and interceptor virtual machine (storing the interceptor repository and Enforcement Configuration Policy) could be provided for each web-service hosting virtual machine. Whilst these embodiments would each introduce a greater overhead on computer resources than the one preceding it, additional flexibility would be introduced, especially by giving different persons different access rights to the different virtual machines.

In summary, a computer network is disclosed in which a group of computers co-operate to perform a distributed application. In order to ensure that only members of that group of computers are able to carry out certain operations, messages sent in the performance of the distributed application are checked by the recipient for the presence of a group membership token. The inclusion of a group membership token is controlled by one or more group membership handlers which intercept messages from local components and only include a group membership token with the message if they list the sending local component as being entitled to include the group membership token in the message. Furthermore, by operating the group membership token on a separate machine, or preferably a separate virtual machine from the local component, security is further improved. In the most preferred embodiments, the group token handler and/or the local component are hosted on virtual machines which provide virtualised cryptographic functionality.

What is claimed is:

1. A computer network comprising a plurality of computers, each hosting one or more local components of a distributed application, wherein said distributed application components interact by passing messages between them in order to perform said distributed application, wherein one or more of said computers comprises:
   a plurality of separate execution environments as partitions;
   a trusted computing platform for providing trust services to each execution environment; and
   a store having instructions encoded therein executable by the computer to cause it to:
   i) execute one or more of said local components of the distributed application in a plurality of first partitions;
   ii) in one or more other partitions shared by the plurality of first partitions,
       a) store one or more group membership tokens for said local distributed application components and information indicating which components are entitled to include the group membership tokens in their messages,
       b) intercept one or more message transmissions from said local components to other computers in said network,
       c) find whether the message-sending local component is entitled to include a group membership token asserting membership of the group with the message,
       d) include the group membership token with the intercepted message if said local component is entitled to the group membership token; and
       e) provide an interface that enables a token authority to update said group membership token store in order to change whether said local component is entitled to have said group membership token included with one or more messages.

2. A computer comprising:
   a plurality of separate execution environments as virtual machines;
   a trusted computing platform for providing trust services to each execution environment; and
   a store having instructions encoded therein executable by the computer to cause it to:
   i) execute one or more of said local components of the distributed application in a plurality of first virtual machines;
   ii) in one or more other virtual machines shared by the plurality of first virtual machines:
       a) store one or more group membership tokens for said local distributed application components and information indicating which components are entitled to include the group membership tokens in their messages
       b) intercept one or more message transmissions from said local components to other computers in said network
       c) find whether the message-sending local component is entitled to include a group membership token asserting membership of the group with the message,
       d) include the group membership token with the intercepted message if said local component is entitled to the group membership token; and
       e) provide an interface that enables a token authority to update said group membership token store in order to change whether said local component is entitled to have said group membership token included with one or more messages.

3. A computer network comprising a plurality of computers, each hosting one or more local components of a distributed application, wherein said distributed application components interact by passing messages between them in order to perform said distributed application, wherein one or more of said computers comprises:
   a plurality of separate execution environments as virtual machines;
   a trusted computing platform for providing trust services to each execution environment; and
   a store having instructions encoded therein executable by the computer to cause it to:
   i) execute one or more of said local components of the distributed application in a plurality of first virtual machines;
   ii) in one or more other virtual machines shared by the plurality of first virtual machines:
       a) store one or more group membership tokens for said local distributed application components and information indicating which components are entitled to include the group membership tokens in their messages
       b) intercept one or more message transmissions from said local components to other computers in said network
       c) find whether the message-sending local component is entitled to include a group membership token asserting membership of the group with the message,
       d) include the group membership token with the intercepted message if said local component is entitled to the group membership token; and
       e) provide an interface that enables a token authority to update said group membership token store in order to change whether said local component is entitled to have said group membership token included with one or more messages.

4. The computer network according to claim 3 wherein the virtual machines include a virtual cryptoprocessor.

5. The computer network according to claim 3 wherein said group membership tokens comprise personalised group membership tokens.

6. The computer network according to claim 3 wherein said store has further instructions encoded therein executable by the computer to cause it, in said one or more other virtual machines, to f) on receipt of a message for a local component involved in the performance of the distributed application, verify the inclusion of a group membership token in said message and to prevent the forwarding of the message to the recipient distributed application component in the event that no valid group membership token is present in the message.

7. In a computer network hosting a plurality of distributed application components which interact by passing messages between them in order to perform said distributed application, a method of controlling group membership comprising operating at least one computer in said computer network, the computer including a plurality of separate execution environments as virtual machines and a trusted computing platform for providing trust services to each execution environment, the computer being operated to:

i) execute one or more of said local components of the distributed application in a plurality of first virtual machines;
ii) in one or more other virtual machines shared by the plurality of first virtual machines:
   a) store one or more group membership tokens for said local distributed application components and information indicating which components are entitled to include the group membership tokens in their messages
   b) intercept one or more message transmissions from said local components to other computers in said network
   c) find whether the message-sending local component is entitled to include a group membership token asserting membership of the group with the message
   d) include the group membership token with the intercepted message if said local component is entitled to the group membership token; and
   e) provide an interface that enables a token authority to update said group membership token store in order to change whether said local component is entitled to have said group membership token included with one or more messages.

8. The method according to claim 7 wherein
creating said virtual machine comprises creating a virtual machine having a virtual cryptoprocessor.

9. A non-transitory computer-readable storage medium storing a program to be executed by a computer, the computer including a plurality of separate execution environments as virtual machines and a trusted computing platform for providing trust services to each execution environment, the program instructing the computer to:

i) execute one or more of said local components of the distributed application in a plurality of first virtual machines;
ii) in one or more other virtual machines shared by the plurality of first virtual machines:
   a) store one or more group membership tokens for said local distributed application components and information indicating which components are entitled to include the group membership tokens in their messages
   b) intercept one or more message transmissions from said local components to other computers in said network
   c) find whether the message-sending local component is entitled to include a group membership token asserting membership of the group with the message
   d) include the group membership token with the intercepted message if said local component is entitled to the group membership token; and
   e) provide an interface that enables a token authority to update said group membership token store in order to change whether said local component is entitled to have said group membership token included with one or more messages.

10. A method of operating a computer including a plurality of separate execution environments as virtual machines and a trusted computing platform for providing trust services to each execution environment, the method comprising:

i) creating a first set of virtual machines comprising a plurality of virtual machines on said computer;
ii) creating a second set of one or more virtual machines on said computer, the second set of virtual machines being shared by the first set of virtual machines;
iii) running, in the second set of virtual machines, software to cause said computer to:
   a) store one or more group membership tokens for local components of distributed applications, each distributed application being performed by distributed application components which interact by passing messages between them
   b) store information indicating which components are entitled to include the group membership tokens in their messages
   c) intercept one or more message transmissions from said local components to other computers in said network
   d) find whether the message-sending local component is entitled to include a group membership token asserting membership of the group with the message, and
   e) include the group membership token with the intercepted message if said local component is entitled to the group membership token.

* * * * *

UNITED STATES PATENT AND TRADEMARK OFFICE
CERTIFICATE OF CORRECTION

PATENT NO. : 8,713,636 B2  Page 1 of 1
APPLICATION NO. : 12/594059
DATED : April 29, 2014
INVENTOR(S) : Dimitrakos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Twenty-ninth Day of September, 2015

Michelle K. Lee
*Director of the United States Patent and Trademark Office*